2,994,717
Patented Aug. 1, 1961

2,994,717
LIQUID PHASE OXIDATION OF CYCLOHEXANE IN THE PRESENCE OF AN ALIPHATIC ACID ANHYDRIDE
Clarence I. Johnson and Carlyle J. Stehman, Decatur, Ala., assignors to The Chemstrand Corporation, Decatur, Ala., a corporation of Delaware
No Drawing. Filed Feb. 26, 1959, Ser. No. 795,614
6 Claims. (Cl. 260—586)

This invention relates to the oxidation of naphthenic hydrocarbons, such as those with a ring of more than five carbon atoms, and more particularly relates to a process for oxidizing cyclohexane in a liquid phase with a molecular oxygen-containing gas.

It is well-known to oxidize cyclohexane or cyclohexane-containing materials, such as crude petroleum cyclohexane, in a liquid phase whereby partial oxidation products thereof, including cyclohexanol and cyclohexanone, are formed. The obtaining of these partial oxidation products constitutes an important step in the manufacture of intermediates, e.g., adipic acid, etc., from which nylon 6–6 and other products are made. Various catalysts such as cobalt naphthenate have been suggested to be employed in the liquid phase oxidation of cyclohexane in order to accelerate the oxidation reaction. Other substances such as certain ketones, aldehydes, and peroxides have been added to the materials to be oxidized in order to start the oxidation reaction, these additives being known as oxidation initiators. While the discoveries of these prior art catalysts and initiators are notable advances in the art, unfortunately the reaction between the cyclohexane and oxygen is normally preceded by a well-defined induction period which heretofore could not be substantially shortened. That is to say, that when cyclohexane is oxidized under optimum conditions in accordance with the prior art methods, there is a period of time in which little or no oxidation of the cyclohexane will occur. However, once the reaction commences, it proceeds at a satisfactory and rapid rate in the prior art processes. This period of time after the cyclohexane and oxygen are contacted under conditions where oxidation will occur but does not proceed to any appreciable extent and before the point in time where oxidation proceeds satisfactorily and rapidly is known as the induction period. Hence, obviously it would be advantageous to shorten or eliminate the induction period occurring when cyclohexane is oxidized.

It is an object of the invention to provide a new and useful process for the oxidation of naphthenic hydrocarbons, such as cyclohexane into partial oxidation products including cyclohexanol and cyclohexanone. It is another object of this invention to provide a new and useful process wherein liquid phase cyclohexane oxidation by molecular oxygen or oxygen-containing gases is initiated more readily. It is still another object of this invention to provide a new and useful process wherein the induction period normally occurring in the liquid phase oxidation of cyclohexane is minimized or eliminated. Other objects will become apparent from the following detailed description of the invention.

In accordance with the present invention it has been found that the induction period discussed above and which normally occurs when cyclohexane is oxidized in the liquid phase with molecular oxygen is greatly reduced or substantially eliminated by the expedient of commencing the oxidation reaction in the presence of a chemical desiccant. Stated another way, the invention comprises adding a quantity of a chemical dessicant to cyclohexane prior to subjecting it to conditions under which cyclohexane is oxidized in a liquid phase with gaseous molecular oxygen or the like so as to form cyclohexanol, cyclohexanone, and other oxidation products whereby the induction period is overcome.

Organic and inorganic chemical desiccants may be used for the purpose of this invention. The desiccant should be inert to cyclohexane and have the ability to remove water by absorption, e.g., it reacts with water as phosphorus pentoxide rather than by adsorption as silica gel, charcoal, and the like, or by formation of hydrates as sodium sulfate, copper sulfate, and the like. Thus, organic lower saturated aliphatic carboxylic acid anhydrides, such as acetic, propionic, butyric, valeric, etc. acid anhydrides, may be used. Similarly, organic cyclic carboxylic acid anhydrides such as phthalic acid anhydrides, etc., may be used. Inorganic desiccants that have utility in accordance with the present process include phosphorus trioxide, phosphorus pentoxide, phosphorus tribromide, alkali metal and alkaline earth metal oxides, such as calcium oxide, barium oxide, sodium oxide, potassium oxide, and the like. There are, of course, many factors to be considered in the selection of a desiccant for the purpose of shortening or eliminating the induction period in addition to the requirement that the desiccant be inert to cyclohexane and have the ability to absorb water; these factors include the cost, the effect that the desiccant has on the reduction of the induction period, and other considerations. Acetic acid anhydride is particularly advantageous from these points of view.

The minimum amount of desiccant that is necessary to be employed in order to effect a substantial reduction of the induction period is variable and obviously is dependent on the reaction conditions employed, the particular catalyst used, and the particular initiator employed if either a catalyst or initiator is used if both of these are used and other process variables. Generally speaking, it can be said that at least a sufficient amount of the desiccant so as to effect a substantial reduction of the induction period should be employed. Use of additional desiccant merely adds to the cost of the process without effecting additional significant reduction of the induction period. In practice amounts of desiccants as low as 1–2 percent or lower by weight based on the materials being oxidized are sufficient, there being no defined upper limit in regard to the quantity of desiccant that can be employed. However, rarely is it necessary to add amounts of desiccant above 30 percent.

By employing relatively large amounts of desiccants, it is possible to induce oxidation of cyclohexane at reduced temperatures where oxidation will not otherwise occur in the absence of the desiccant, this being advantageous for obvious reasons.

The process of this invention may be carried out in suitable equipment, such as an autoclave having means for stirring and means for removal of the water formed during the oxidation reaction or similar autoclaves arranged to be operated in a continuous fashion. The cyclohexane may be pure; and it may be crude petroleum cyclohexane. The desiccant is added to the cyclohexane feed material either before or after it is placed in the autoclave. The temperature maintained in the autoclave is elevated to between 75° and 200° C., preferably 120° to 165° C. and the pressure therein is maintained at 50 to 500 (preferably 50 to 250) pounds per square inch gauge, the conditions being correlated so that the cyclohexane is in a liquid state and will be oxidized with molecular oxygen within a reasonable length of time. In practice the desired quantity of cyclohexane is added to the autoclave and under the just-mentioned conditions is strongly agitated with a gas containing molecular oxygen being introduced into the stirred cyclohexane. Air is preferably the source of molecular oxygen with which to effect the oxidation reaction for obvious reasons. However, it will be appreciated that other suitable sources of molecular oxygen may be used.

In conjunction with the use of the chemical desiccants of the present invention oxidation catalysts and/or initiators may be employed. The quantities of catalysts and initiators are ordinarily small. For example, with a hydrocarbon-soluble salt of cobalt such as cobalt naphthenate quantities of the order of one part per million of cobalt or more give good results. Other conventional catalysts known in the art include hydrocarbon-soluble compounds of copper, aluminum, chromium, manganese, etc.; the hydrocarbon-soluble compounds of cobalt, however, give the best results. Amounts of initiators of the order of 0.1 to 0.5 percent by weight may be used. Cyclohexanone is the preferred initiator of those initiators known in the art.

For a more detailed description of the present invention, reference is made to the following specfic examples that are merely intended to be illustrative and not limitative. In the examples all parts and percentages are by weight unless otherwse indicated.

*Example I*

A mixture containing 962 grams of petroleum cyclohexane that contained 87.6 percent cyclohexane by weight, 2.8 grams of cyclohexanone initiator, and 50 p.p.m. of cobalt naphthenate oxidation catalyst (as cobalt) was charged into a two liter stainless steel autoclave. The autoclave was provided with a blade stirrer for agitating the liquid therein and a valved gas inlet line for introducing a gas near the bottom of and into the autoclave and also was equipped with a reflux condenser and a decanter for removing water and a valved gas outlet line. The temperature of the mixture in the autoclave was raised to 155° C. with the mixture being stirred. Air from a tank containing compressed air was introduced at a rate of 0.08 cubic foot per minute into the autoclave through said gas inlet line, with the system being pressurized to 110 pounds per square inch gauge. Samples of the off gas were periodically taken. It was found from the analyses of the off gas that the oxygen content thereof did not appreciably drop for a period of time of 40 minutes, at which instance the oxygen content dropped sharply from 20 percent to 0.3 percent by volume. This indicated that the oxidation reaction was preceded by an extended and well-defined period during which little, if any, oxidation occurred. Thereafter, the oxidation proceeded quite rapidly with the oxygen content of the off gas remaining at the low level of 0.3 percent by volume until completion of the reaction.

For purposes of determining the induction period, such period may be defined as the time required for the oxygen content of the off gas on a volume basis to drop below 2 percent. Hence, in this example the induction period according to this definition was 40 minutes.

*Example II*

A mixture containing 948 grams of petroleum cyclohexane that contained 87.6 percent cyclohexane by weight, 2.8 grams of cyclohexanone initiator, 50 p.p.m. of cobalt naphthenate catalyst (as cobalt), and 130 grams of acetic acid anhydride was charged into an autoclave described above in Example I. The temperature of the mixture in the autoclave was raised to 155° C. with the mixture being stirred. Air from a tank containing compressed air was introduced at a rate of 0.08 cubic foot per minute into the mixture with the system in the autoclave being pressurized to 110 pounds per square inch gauge. Samples of the off gas were taken periodically. It was found from the analyses thereof that the oxygen content of the off gas never initially exceeded 0.3 percent. This indicated that the oxidation of the cyclohexane was preceded by substantially no induction period.

*Example III*

A mixture containing 827 grams of petroleum cyclohexane (87.6 percent cyclohexane by weight), 2.4 grams of cyclohexanone initiator, 50 p.p.m. of cobalt naphthenate catalyst (as cobalt), and 330 grams of acetic acid anhydride was charged into an autoclave as above. The temperature of the mixture in the autoclave was raised to 130° C. with the mixture being stirred. Air from a tank containing compressed air was introduced at a rate of 0.07 cubic foot per minute into the mixture with the system in the autoclave being pressurized to 110 pounds per square inch gauge. Samples of the off gas were taken periodically. It was found from the analyses thereof that the oxygen content of the off gas never initially exceeded 0.3 percent. This indicated that the oxidation of the cyclohexane was preceded by substantially no induction period. However, when the same mixture not containing acetic anhydride was subjected to the same oxidation conditions, oxidation was not initiated even after 100 minutes.

EXAMPLE IV

A mixture containing 827 grams of petroleum cyclohexane (87.6 percent cyclohexane by weight), 2.4 grams of cyclohexanone initiator, 50 p.p.m. of cobalt naphthenate catalyst (as cobalt), and 330 grams of acetic acid anhydride was charged into an autoclave as above. The temperature of the mixture was raised to 110° C. with the mixture being stirred. Air from a tank containing compressed air was introduced at a rate of 0.07 cubic foot per minute into the mixture with the system in the autoclave being pressurized to 110 pounds per square inch gauge. Samples of the off gas were taken periodically. It was found from the analyses thereof that the oxygen content of the off gas dropped below 2 percent after a period of 45 minutes, this being the induction period. However, when the same mixture not containing acetic anhydride was subjected to the same oxidation conditions, oxidation of the cyclohexane could not be accomplished.

*Example V*

A mixture containing 951 grams of petroleum cyclohexane (87.6 percent cyclohexane by weight), 2.8 grams of cyclohexanone initiator, 60 p.p.m. of cobalt naphthenate catalyst (as cobalt), and 63 grams of calcium oxide was charged into an autoclave as above. The temperature of the mixture was raised to 156° C. with the mixture being stirred. Air from a tank containing compressed air was introduced at a rate of 0.08 cubic foot per minute into the mixture with the system being pressurized to 110 pounds per square inch gauge. Samples of the off gas were taken periodically. It was found from the analyses thereof that the maximum oxygen content of the off gas was 3.0 percent and that the ogygen content dropped below 2 percent after a period 11 minutes, this being induction period.

Likewise, when other chemical desiccants, such as propionic anhydride, butyric anhydride, etc., phosphorus tribromide, phosphorus pentoxide, and the like are employed according to the present invention, similar excellent results in regard to the elimination or substantial reduction of the induction period preceding the liquid phase oxidation of cyclohexane with air or other suitable molecular oxygen-containing gas are obtained.

Therefore, it is seen that there are distinct advantages inherent in the process, among the most notable of which is that the use of the chemical desiccants herein described shortens the induction period of the oxidation of cyclohexane. Hence, the use of these desiccants provides greater productivity in a given piece of equipment, thereby providing for economy of operation. Moreover, the liquid phase oxidation of cyclohexane may be carried out successfully at lower reaction temperatures in the presence of these desiccants. Numerous other advantages will be apparent to those skilled in the art.

It is to be understood that changes and variations may be made without departing from the spirit and scope of the invention as defined in the appended claims.

What is claimed is:

1. A process of oxidizing cyclohexane in the liquid phase into partial oxidation products including cyclohexanol and cyclohexanone comprising the steps of forming a mixture of cyclohexane, a catalytic amount of an oxidation catalyst, and about 1.0–30 percent based on the weight of cyclohexane of a lower saturated aliphatic acid anhydride; and under a pressure of 50–500 pounds per square inch gauge heating the resulting mixture at a temperature of 75–250° C. in the presence of a gas containing molecular oxygen to oxidize the cyclohexane into said oxidation products without a substantial induction period preceding the oxidation reaction.

2. The process of claim 1 wherein the oxidation is carried out at 120–165° C. and at a pressure of 50–250 pounds per square inch gauge.

3. A process of oxidizing cyclohexane in the liquid phase into partial oxidation products including cyclohexanol and cyclohexanone comprising the steps of forming a mixture of cyclohexane, a catalytic amount of hydrocarbon-soluble salt of cobalt, and about 1.0–30 percent based on the weight of the cyclohexane of acetic acid anhydride; and under a pressure of 50–500 pounds per square inch gauge heating the resulting mixture at a temperature of 70–250° C. in the presence of a gas containing molecular oxygen to oxidize the cyclohexane into said oxidation products without a substantial induction period preceding the oxidation reaction.

4. The process of claim 3 wherein the gas is air.

5. A process of oxidizing cyclohexane in the liquid phase into partial oxidation products including cyclohexanol and cyclohexanone comprising the steps of forming a mixture of cyclohexane, a catalytic amount of cobalt naphthenate, and about 1.0–30 percent based on the weight of the cyclohexane of acetic acid anhydride; and under a pressure of 50–250 pounds per square inch gauge heating the resulting mixture at a temperature of 120–165° C. in the presence of air to oxidize the cyclohexane into said oxidation products without a substantial induction period preceding the oxidation reaction.

6. The process of claim 5 wherein 0.1 to 0.5 percent by weight of cyclohexanone is added to the mixture as an initiator for the oxidation reaction.

References Cited in the file of this patent

UNITED STATES PATENTS

| | | |
|---|---|---|
| 2,410,642 | Farkas et al. | Nov. 5, 1946 |
| 2,790,004 | Dougherty | Apr. 23, 1957 |